United States Patent
Wu

(10) Patent No.: US 10,407,883 B2
(45) Date of Patent: Sep. 10, 2019

(54) CURVED PLASTIC FAUCET

(71) Applicant: LUO DA SHI HARDWARE(HUIZHOU) LIMITED COMPANY, Huizhou, Guangdong Province (CN)

(72) Inventor: Fong-Yu Wu, Huizhou (CN)

(73) Assignee: Luo Da Shi Hardware (Huizhou) Limited Company, Huizhou, Guangdong Province (CN)

(*) Notice: Subject to any disclaimer, the term of this patent is extended or adjusted under 35 U.S.C. 154(b) by 46 days.

(21) Appl. No.: 15/876,391

(22) Filed: Jan. 22, 2018

(65) Prior Publication Data
US 2019/0226187 A1  Jul. 25, 2019

(51) Int. Cl.
 *E03C 1/04* (2006.01)
 *E03C 1/084* (2006.01)
 *F16L 15/00* (2006.01)

(52) U.S. Cl.
 CPC .......... *E03C 1/0404* (2013.01); *E03C 1/0401* (2013.01); *E03C 1/084* (2013.01); *F16L 15/008* (2013.01)

(58) Field of Classification Search
 CPC ........ E03C 1/0401; E03C 1/0404; E03C 1/08; E03C 1/084
 USPC .............................................................. 4/678
 See application file for complete search history.

(56) References Cited

U.S. PATENT DOCUMENTS

| 5,165,121 | A | * | 11/1992 | McTargett | E03C 1/02 137/801 |
| 5,555,912 | A | * | 9/1996 | Saadi | E03C 1/0404 137/801 |
| 5,579,808 | A | * | 12/1996 | Mikol | E03C 1/0404 137/375 |
| 10,214,884 | B1 | * | 2/2019 | You | E03C 1/0404 |
| 2005/0103389 | A1 | * | 5/2005 | Wei | E03C 1/0404 137/801 |
| 2014/0054478 | A1 | * | 2/2014 | Esche | F16K 31/05 251/129.03 |
| 2016/0263796 | A1 | * | 9/2016 | Hua | B29C 45/14778 |

* cited by examiner

*Primary Examiner* — Huyen D Le
(74) *Attorney, Agent, or Firm* — Alan D. Kamrath; Mayer & Williams PC

(57) ABSTRACT

A curved plastic faucet contains: a body, an arcuate tube, connector, and a supply head. The body includes a connection member. The arcuate tube includes an inflow segment, an outflow segment, an arc-shaped section extending to ¼ circumference length of the inflow segment from the outflow segment, and an arcuate water conduit which has an imaginary arc line being an arcuate section of a circle and a length of the arcuate section is not more than ¼ of the circle, wherein a cross section of the arcuate water conduit proximate to the inflow segment is not more than that of the outflow segment, and an outlet is defined adjacent to a lower end of the outflow segment. The connector includes an inlet and at least one stop ring. The supply head includes a guide space and a second screwing portion mating with a first screwing portion.

5 Claims, 8 Drawing Sheets

CURVED PLASTIC FAUCET

BACKGROUND OF THE INVENTION

Field of the Invention

The present invention relates to a distal end of a water pipe fixed in a both room or a kitchen so as to switch a faucet, and more particularly to a faucet structure made of plastic.

Description of the Prior Art

A conventional faucet is made of metal or plastic, wherein when the conventional faucet is made of the metal, it is casted or is welded from a curved tube. The curved tube has various arcuate conduits and shapes when the conventional faucet is casted or is welded from the curved tube (multiple metal tubes are bent and welded so as to produce the faucet having a variety of curved conducts). When the conventional faucet is made using plastic injection molding, it is demolded in a limited direction so as to avoid a variety of changeable and complicated conduits.

When the conventional faucet is made of metal, it has metal appearance or is electroplated in a surface treating manner so as to achieve strength. However, when the conventional faucet is made of plastic, only a limited plastic material can be electroplated.

As illustrated in FIG. 8, a conventional plastic faucet contains a plastic conduit 70 and a plastic shell 80.

The plastic conduit 70 includes a hollow outflow tube 71 extending straightly, the hollow outflow tube 71 has an inlet 72 extending downward from a first end thereof, an outlet 73 extending downward from a second end thereof, a removal orifice extending straightly from the hollow outflow tube 71 so that the plastic faucet is made using plastic injection molding, a stop ring 74 configured to close the removal orifice after injection molding, wherein the removal orifice is closed in a high frequency manner so that water flows out of the outlet 73 from the inlet 72 via the hollow outflow tube 71, and the plastic conduit 70 has a cap 75 arranged on two sides thereof.

The plastic shell 80 is made of electroplating material and has a surface 81, an internal chamber 82, and a connection face 83 defined between the surface 81 and the internal chamber 82, wherein the surface 81 is configured to electroplate, the internal chamber 82 is configured to accommodate the plastic conduit 70, and the cap 75 of the plastic conduit 70 covers the connection face 83, wherein the cap 75 is connected with the connection face 83 in a high frequency manner.

When the plastic shell 80 is electroplated on the surface 81, protective oil is coated on the connection face 83 so that the connection face 83 is not electroplated with the metal in a plating process, thus connecting the cap 75 and the connection face 83 is connected by high frequency manner.

Thereby, the conventional plastic faucet contains the plastic conduit 70, at least one stop ring 74, and the plastic shell 80, so it has complicated components and is assembled in high frequency manner and oil coating manner complicatedly, thus having high machining cost and slow manufacture process. The plastic conduit 70 of the conventional plastic faucet is black to lower aesthetic appearance as forming below the plastic shell 80. In addition, a molding line produces between the plastic conduit 70 and the plastic shell 80, thus having poor appearance and dirt on the molding line.

To mold the hollow outflow tube 71, the inlet 72 and the outlet 73, the hollow outflow tube 71 only can extend straight, so the plastic shell 80 is limited and its appearance is not smooth and aesthetic.

The present invention has arisen to mitigate and/or obviate the afore-described disadvantages.

SUMMARY OF THE INVENTION

The primary objective of the present invention is to provide a curved plastic faucet in which an arcuate tube includes an arc-shaped section extending to ¼ circumference length of an inflow segment from an outflow segment, an arcuate water conduit has an imaginary arc line defined on a center thereof, the imaginary arc line is an arcuate section of a circle and a length of the arcuate section is not more than ¼ of the circle so that a first radius, a second radius, and a second radius are equal, wherein a cross section of the arcuate water conduit proximate to the inflow segment is not more than that of the outflow segment, such that the arcuate tube is manufactured integrally so as to obtain aesthetic appearance, to reduce components, to avoid using high frequency connection and coating protective oil, and to lower fabrication cost.

Another objective of the present invention is to provide a curved plastic faucet in which an outlet is defined adjacent to a lower end of the outflow segment so that a limitation portion is formed between the outlet and the outflow segment, when a connector is connected into the arcuate water conduit from the outflow segment, and a supply head is coupled with the connector via the outlet, the connector is limited by the limitation portion in the extending direction of the arcuate water conduit so as to avoid the connector being pushed out of the arcuate water conduit by a pressure of a water.

To obtain above-mentioned objectives, a curved plastic faucet provided by the present invention contains: a body, an arcuate tube, connector, and a supply head.

The body includes a connection member configured to a water supply source.

The arcuate tube is integrally injection molded from plastic, and the arcuate tube includes an inflow segment and an outflow segment, wherein the inflow segment is coupled with the connection member of the body and communicates with the water supply source, and the arcuate tube further includes an arc-shaped section extending to ¼ circumference length of the inflow segment from the outflow segment, an arcuate water conduit defined in the arc-shaped section, wherein two ends of the arcuate water conduit are in connection with the inflow segment and the outflow segment respectively, and the arcuate water conduit has an imaginary arc line defined on a center thereof, the imaginary arc line is an arcuate section of a circle and a length of the arcuate section is not more than ¼ of the circle, wherein a first radius is defined on a central section of the imaginary arc line, a second radius is adjacent to the inflow segment, and a third radius is close to the outflow segment, wherein the first radius, the second radius, and the second radius are equal, wherein a cross section of the arcuate water conduit proximate to the inflow segment is not more than that of the outflow segment, and an outlet is defined adjacent to a lower end of the outflow segment so that a part of the outflow segment in the outlet has a limitation portion formed thereon.

The connector includes an inlet defined on a first end of the connector and extending downward to a second end of the connector so as to communicate with an opening and to cooperate with a profile and the cross section of the arcuate water conduit, a first screwing portion formed on the opening, at least one stop ring adjacent to an outer rim of the inlet, wherein the connector is connected into the arcuate water conduit from the outflow segment so that at least one stop ring stops the water leaking from the outflow segment and the outlet, and the opening corresponds to the outlet.

The supply head includes a guide space defined on a center of the supply head so as to flow the water, and the supply head includes a second screwing portion mating with the first screwing portion, wherein supply head passes through the outlet to connect with the connector.

DETAILED DESCRIPTION OF THE PREFERRED EMBODIMENTS

Figure 1:
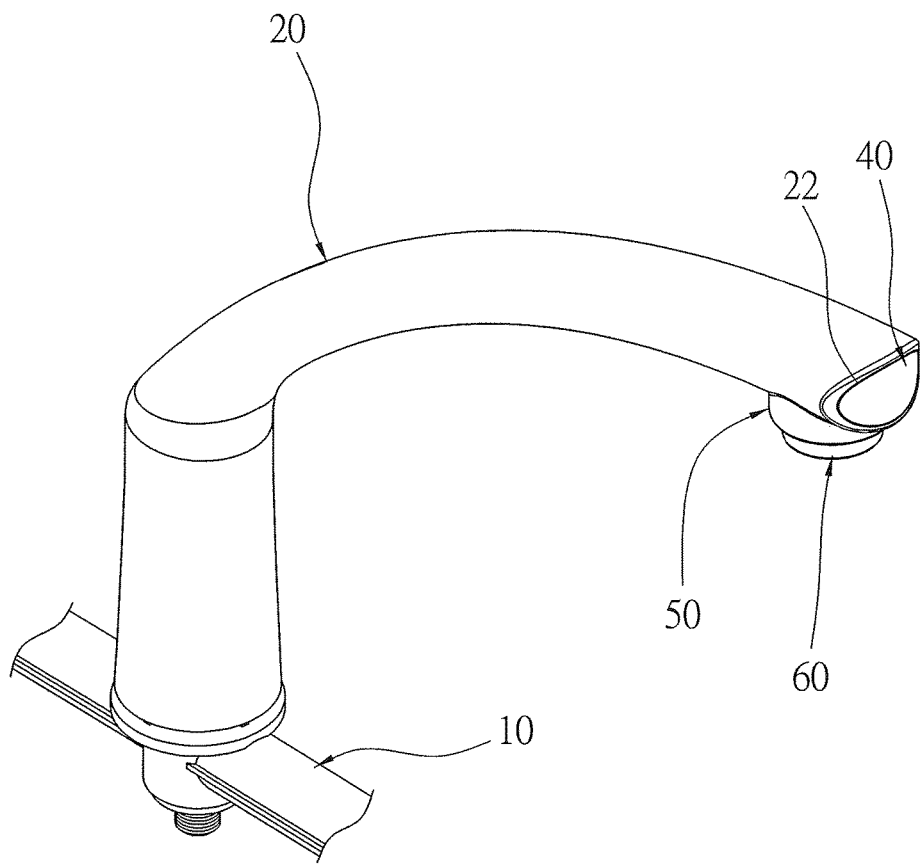
FIG. 1 is a perspective view showing the assembly of a curved plastic faucet according to a preferred embodiment of the present invention.
Figure 2:
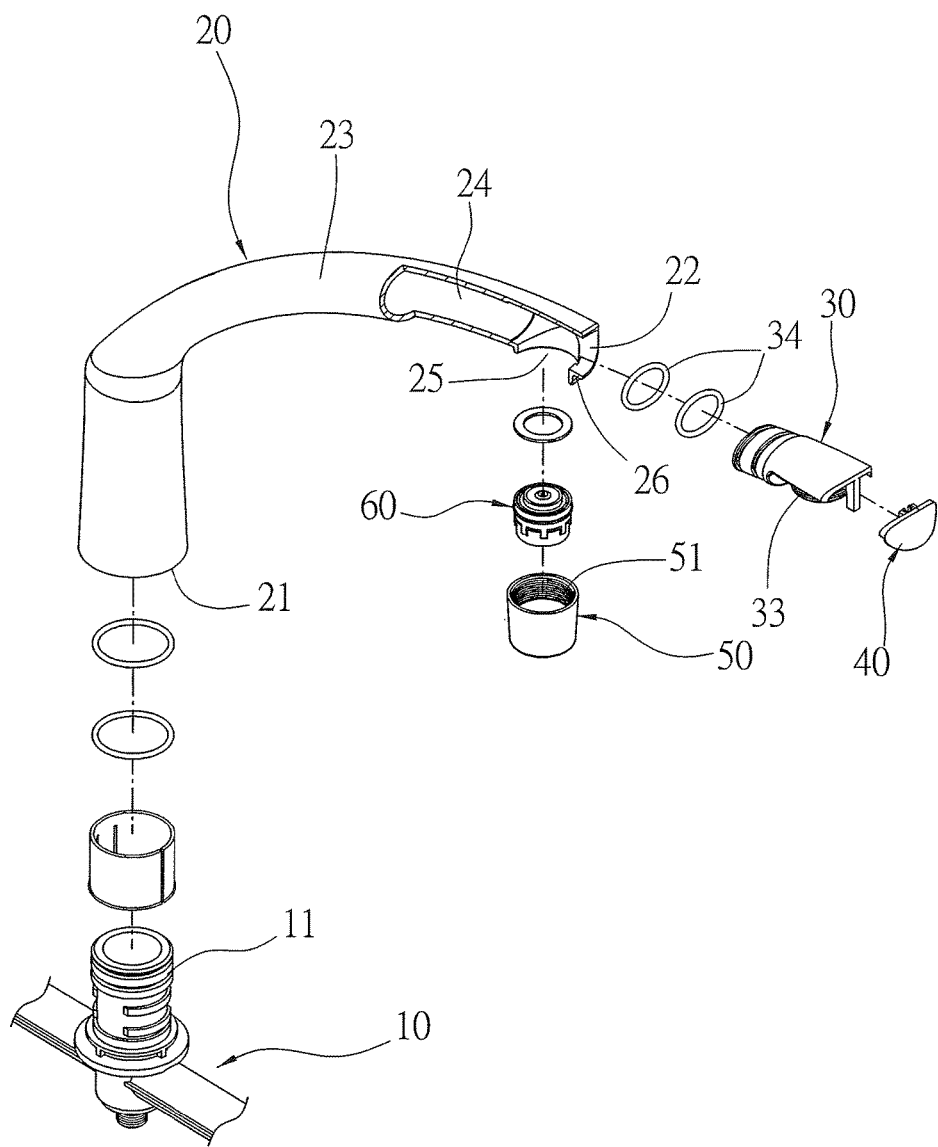
FIG. 2 is a perspective view showing the exploded components of the curved plastic faucet according to the preferred embodiment of the present invention.

The present invention will be clearer from the following description when viewed together with the accompanying drawings, which show, for purpose of illustrations only, a preferred embodiment in accordance with the present invention.

With reference to FIGS. 1-4, a curved plastic faucet in accordance with a preferred embodiment of the present invention comprises: a body 10, an arcuate tube 20, a connector 30, a cap 40, a supply head 50, and a bubble dispenser 60.

The body 10 is made using plastic injection molding, and the body 10 includes a connection member 11 and is in connection with a water supply source and a control valve, wherein the control valve controls water to flow toward the connection member 11 from the water supply source.

The arcuate tube 20 is integrally injection molded from electroplatable plastic, and the arcuate tube 20 includes an inflow segment 21 and an outflow segment 22, wherein the inflow segment 21 is coupled with the connection member 11 and communicates with the water supply source, and the arcuate tube 20 further includes an arc-shaped section 23 extending to ¼ circumference length of the inflow segment 21 from the outflow segment 22, an arcuate water conduit 24 defined in the arc-shaped section 23, wherein two ends of the arcuate water conduit 24 are in connection with the inflow segment 21 and the outflow segment 22 respectively, wherein the arcuate water conduit 24 has an imaginary arc line A1 defined on a center thereof, and the imaginary arc line A1 is an arcuate section of a circle and a length of the arcuate section is not more than ¼ of the circle, wherein a first radius R1 is defined on a central section of the imaginary arc line A1, a second radius R2 is adjacent to the inflow segment 21, and a third radius R3 is close to the outflow segment 22, wherein the first radius R1, the second radius R2, and the second radius R3 are equal. A cross section of the arcuate water conduit 24 proximate to the inflow segment 21 is not more than that of the outflow segment 22, and an outlet 25 is defined adjacent to a lower end of the outflow segment 22 so that a part of the outflow segment 22 in the outlet 25 has a limitation portion 26 formed thereon.

The connector 30 is made using plastic injection molding, and the connector 30 includes an inlet 31 defined on a first end thereof and extending downward to a second end of the connector 30 so as to communicate with an opening 32 and to cooperate with a profile and the cross section of the arcuate water conduit 24, a first screwing portion 33 formed on the opening 32 and being outer threads, at least one stop ring 34 adjacent to an outer rim of the inlet 31, wherein the connector 30 is connected into the arcuate water conduit 24 from the outflow segment 22 so that at least one stop ring 34 stops the water leaking from the outflow segment 22 and the outlet 25, and the opening 32 corresponds to the outlet 25.

The cap 40 is injection molded from electroplatable plastic and cooperates with a shape of the outflow segment 22, the cap 40 covers and closes the outflow segment 22.

Figure 5:
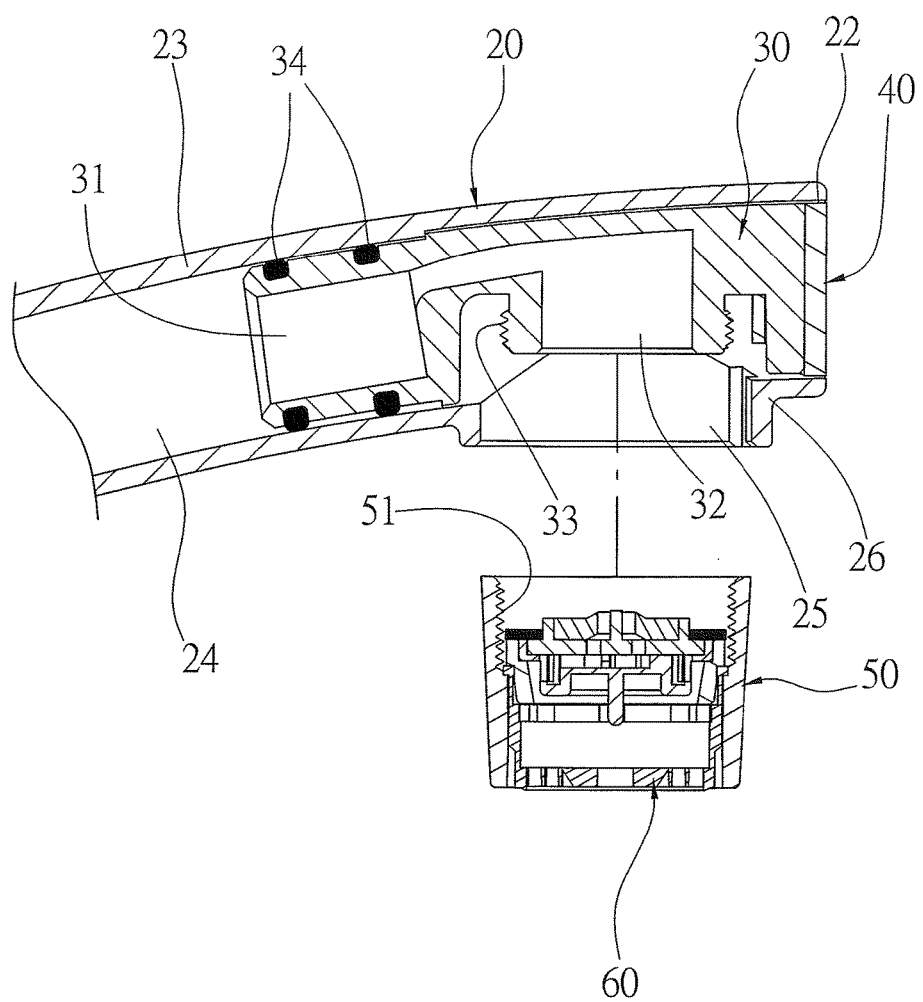
FIG. 5 is another cross sectional view showing the exploded components of a part of the curved plastic faucet according to the preferred embodiment of the present invention.
Figure 6:
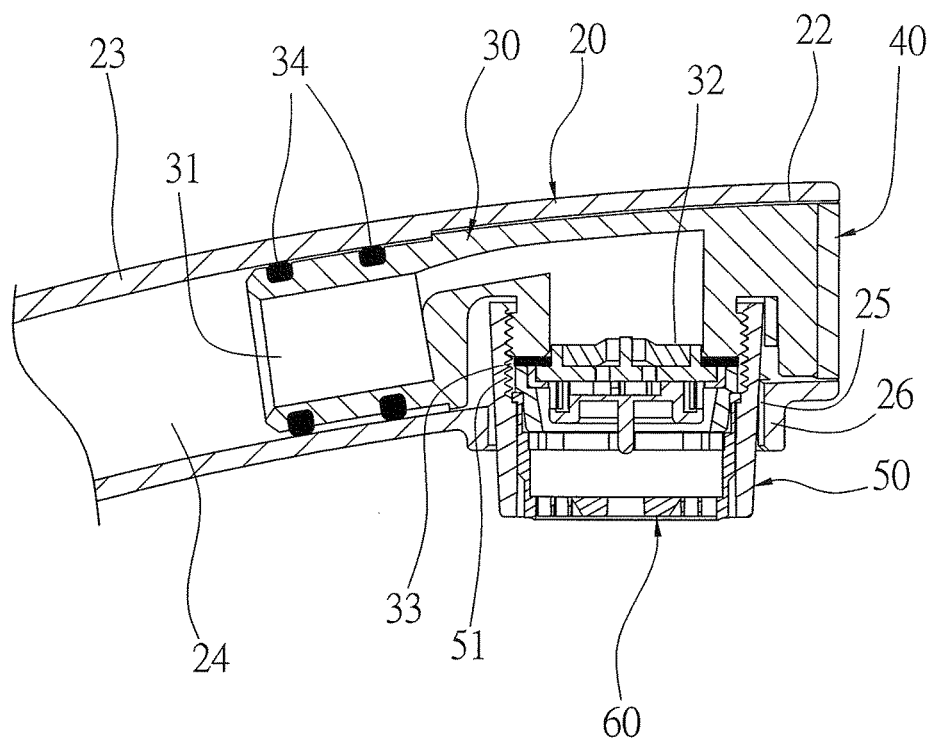
FIG. 6 is a cross sectional view showing the assembly of a part of the curved plastic faucet according to the preferred embodiment of the present invention.

The supply head 50 includes a guide space defined on a center thereof so as to flow the water, and the supply head 50 includes a second screwing portion 51 mating with the first screwing portion 33, wherein the second screwing portion 51 is inner threads, such that after the supply head 50 passes through the outlet 25 and the connector 30, the limitation portion 26 limits an extending direction of the arcuate water conduit 24, as shown in FIGS. 5 and 6.

The bubble dispenser 60 is housed in the supply head 50 so that when the water flows through the bubble dispenser 60, the bubble dispenser 60 produces bubbles.

Figure 3:
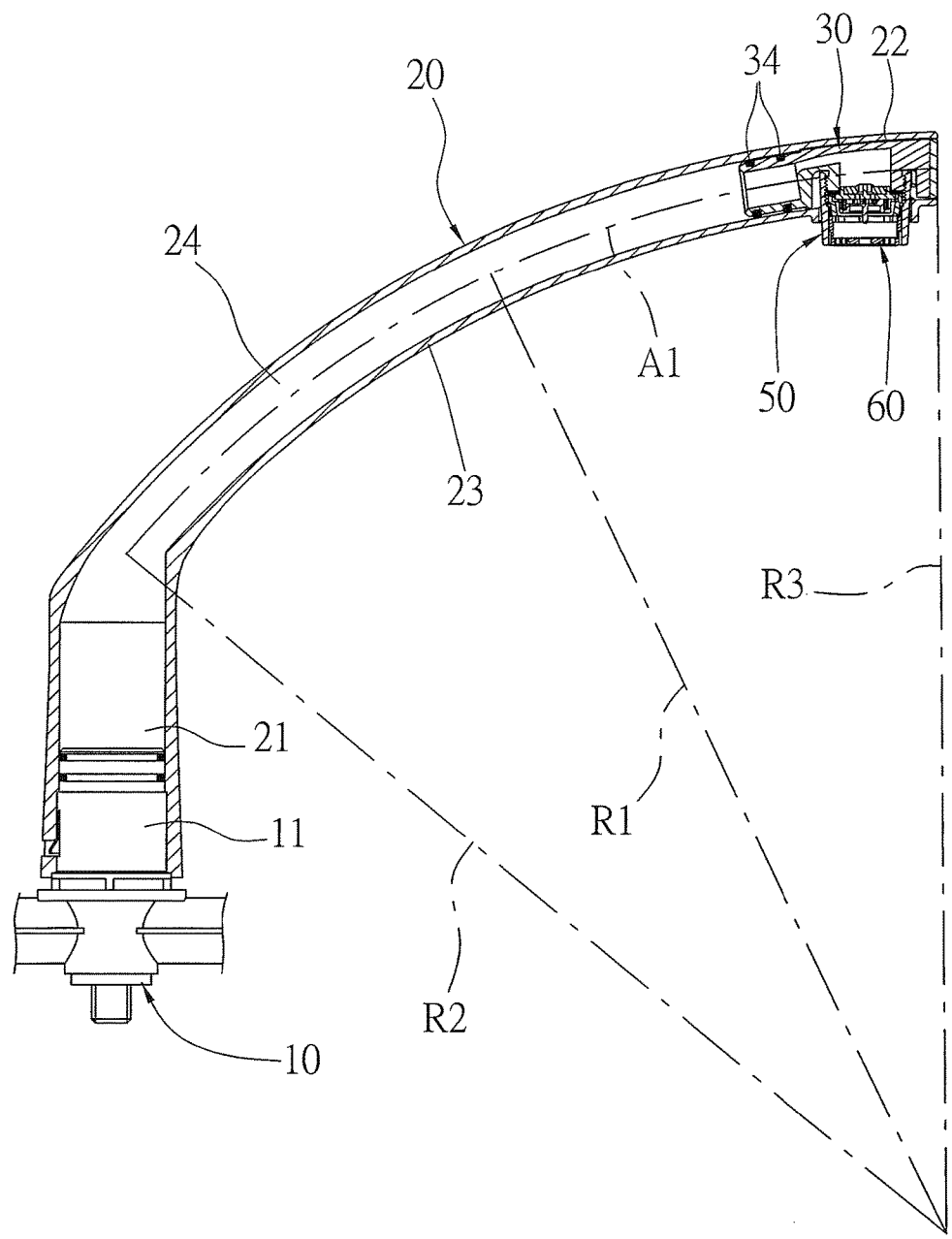
FIG. 3 is a cross sectional view showing the assembly of the curved plastic faucet according to the preferred embodiment of the present invention.
Figure 4:
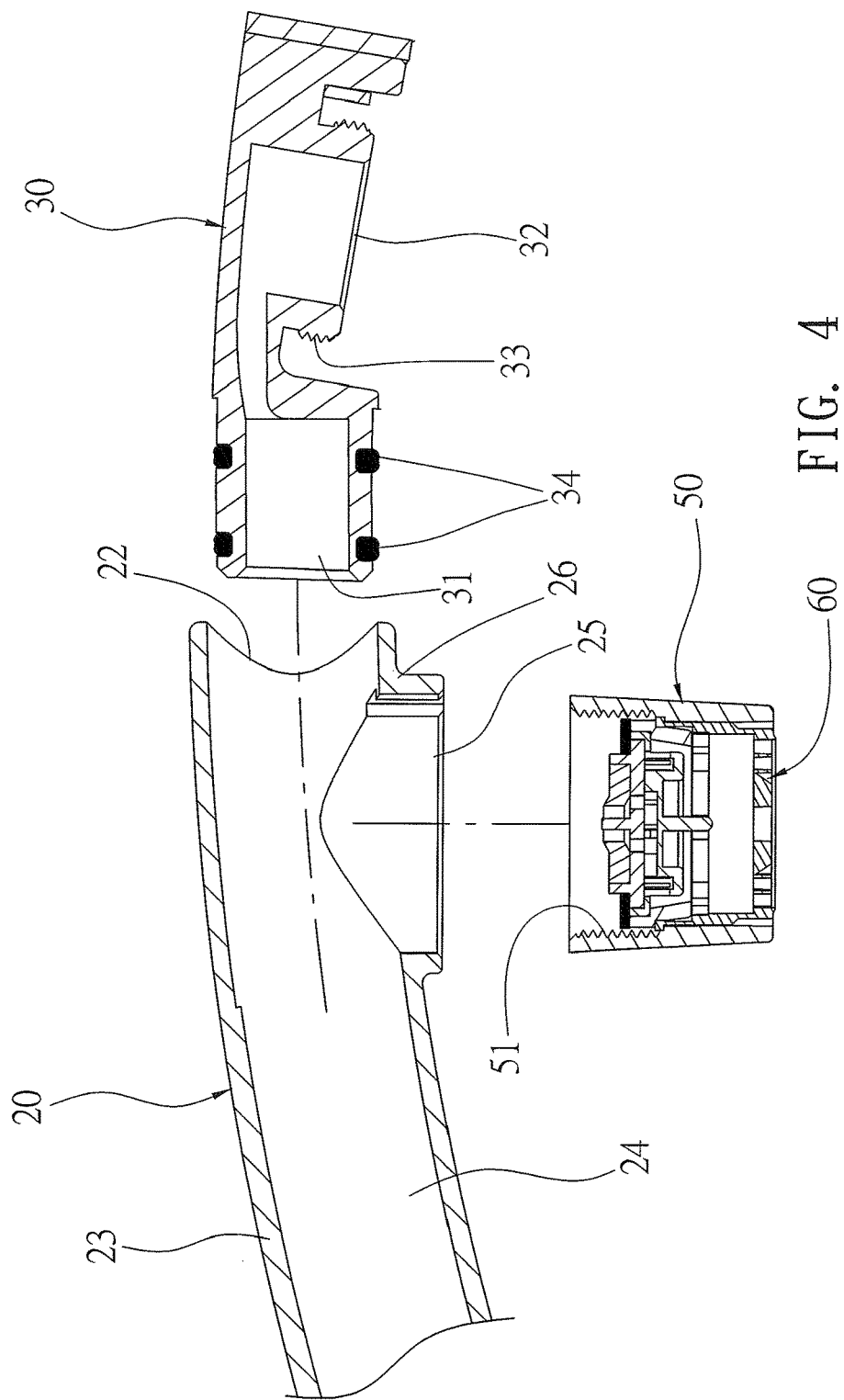
FIG. 4 is a cross sectional view showing the exploded components of a part of the curved plastic faucet according to the preferred embodiment of the present invention.
Figure 7:
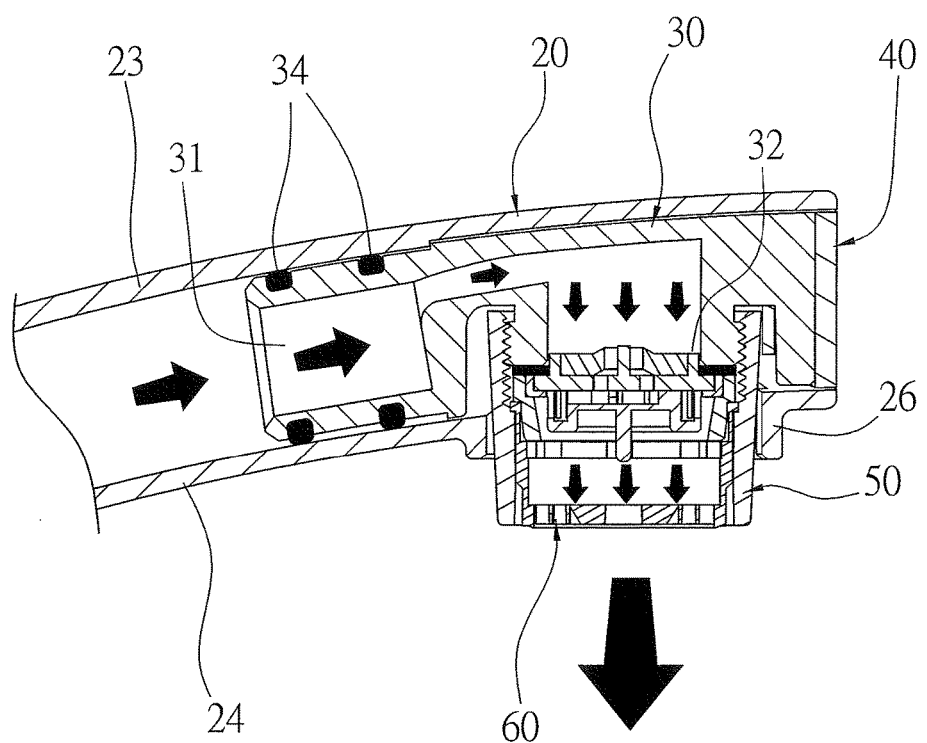
FIG. 7 is an amplified view of FIG. 6.
Figure 8:
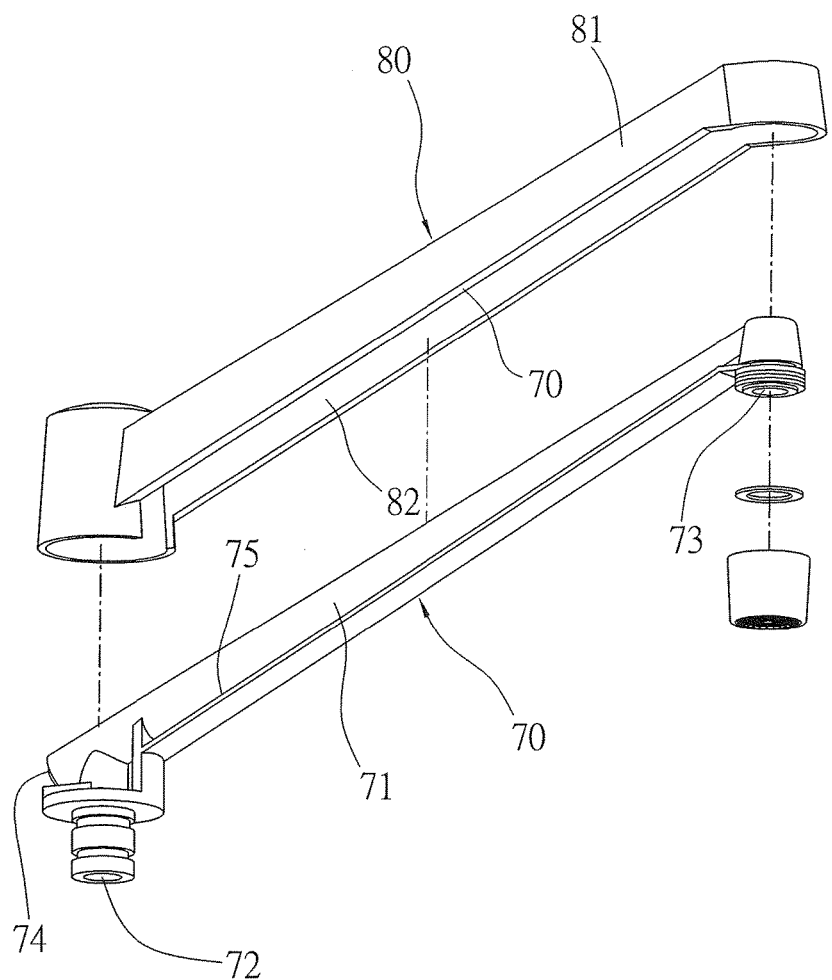
FIG. 8 is a perspective view of a conventional plastic faucet.

Referring to FIGS. 1, 3, and 7, in use, after the water flows into the body 10, it is switched to stop flow or to flow into the inflow segment 21 of the arcuate tube 20 via the connection member 11, and the water flows into the inlet 31 of the connector 30 from the arcuate water conduit 24, then the water flows out of the bubble dispenser 60 from the opening 32 via the supply head 50.

When the water flows into the arcuate water conduit 24 of the arcuate tube 20, the connector 30 is pushed by a pressure of the water. Due to the supply head 50 is locked with the connector 30 in another direction, and the connector 30 is limited by the limitation portion 26 in the extending direction of the arcuate water conduit 24, the connector 30 is not pushed out of the arcuate water conduit 24 by the pressure of the water, hence the connector 30 is not limited in a conventional high frequency manner or in an adhesive manner.

Accordingly, the arcuate tube 20 further includes the arc-shaped section 23 extending to ¼ circumference length of the inflow segment 21 from the outflow segment 22, the arcuate water conduit 24 has the imaginary arc line A1 defined on the center thereof, the imaginary arc line A1 is the arcuate section of the circle and a length of the arcuate section is not more than ¼ of the circle so that the first radius R1, the second radius R2, and the second radius R3 are equal, wherein the cross section of the arcuate water conduit 24 proximate to the inflow segment 21 is not more than that of the outflow segment 22, such that the arcuate tube 20 is manufactured integrally so as to obtain aesthetic appearance, to reduce components, to avoid using high frequency connection and coating protective oil, and to lower fabrication cost. Furthermore, the outlet 25 is defined adjacent to the lower end of the outflow segment 22 so that the limitation portion 26 is formed between the outlet 25 and the outflow segment 22, when the connector 30 is connected into the arcuate water conduit 24 from the outflow segment 22, and the supply head 50 is coupled with the connector 30 via the outlet 25, the connector 30 is limited by the limitation portion 26 in the extending direction of the arcuate water conduit 24 so as to avoid the connector 30 being pushed out of the arcuate water conduit 24 by the pressure of the water. Preferably, the cap 40 is not forced by the pressure of the water, and the curved plastic faucet is manufactured easily without using the conventional high frequency connection.

While various embodiments in accordance with the present invention have been shown and described, it is clear to those skilled in the art that further embodiments may be made without departing from the scope of the present invention.

What is claimed is:

1. A curved plastic faucet comprising:

a body including a connection member configured to a water supply source;

an arcuate tube is integrally made using plastic injection molding, and the arcuate tube including an inflow segment and an outflow segment, wherein the inflow segment is coupled with the connection member of the body and communicates with the water supply source, and the arcuate tube further includes an arc-shaped section extending to ¼ circumference length of the inflow segment from the outflow segment, an arcuate water conduit defined in the arc-shaped section, wherein two ends of the arcuate water conduit are in connection with the inflow segment and the outflow segment respectively, and the arcuate water conduit has an imaginary arc line defined on a center thereof, the imaginary arc line is an arcuate section of a circle and a length of the arcuate section is not more than ¼ of the circle, wherein a first radius is defined on a central section of the imaginary arc line, a second radius is adjacent to the inflow segment, and a third radius is close to the outflow segment, wherein the first radius, the second radius, and the second radius are equal, wherein a cross section of the arcuate water conduit proximate to the inflow segment is not more than that of the outflow segment, and an outlet is defined adjacent to a lower end of the outflow segment so that a part of the outflow segment in the outlet has a limitation portion formed thereon;

a connector including an inlet defined on a first end of the connector and extending downward to a second end of the connector so as to communicate with an opening and to cooperate with a profile and the cross section of the arcuate water conduit, a first screwing portion formed on the opening, at least one stop ring adjacent to an outer rim of the inlet, wherein the connector is connected into the arcuate water conduit from the outflow segment so that at least one stop ring stops the water leaking from the outflow segment and the outlet, and the opening corresponds to the outlet; and a supply head including a guide space defined on a center of the supply head so as to flow the water, and the supply head including a second screwing portion mating with the first screwing portion, wherein supply head passes through the outlet to connect with the connector.

2. The curved plastic faucet as claimed in claim 1, wherein the connector is made using plastic injection molding, the first screwing portion is outer threads, and the second screwing portion of the supply head is inner threads.

3. The curved plastic faucet as claimed in claim 1 further comprising a cap is integrally injection molded from electroplatable plastic and cooperating with a shape of the outflow segment, wherein the cap covers and closes the outflow segment.

4. The curved plastic faucet as claimed in claim 1, further comprising a bubble dispenser housed in the supply head.

5. The curved plastic faucet as claimed in claim 1, wherein the arcuate tube is electroplatable plastic.

* * * * *